Dec. 9, 1924.  
R. J. BURROWS  
1,518,770  
VEHICLE BRAKE OPERATING MECHANISM  
Filed May 17, 1923
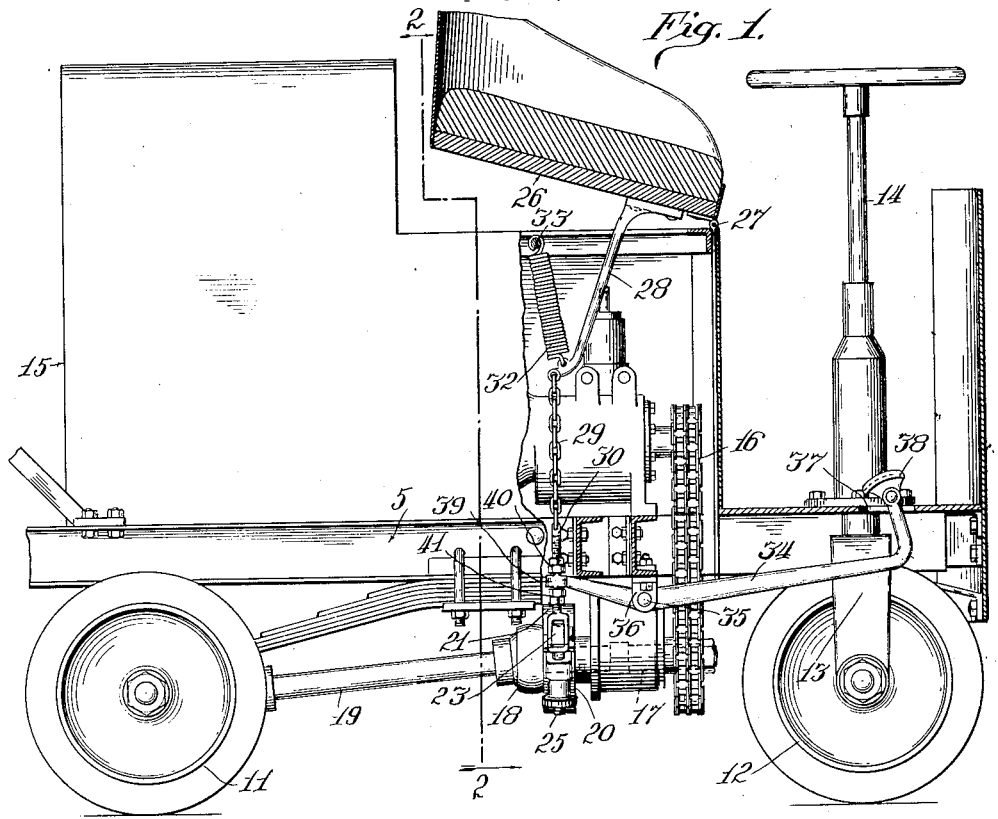
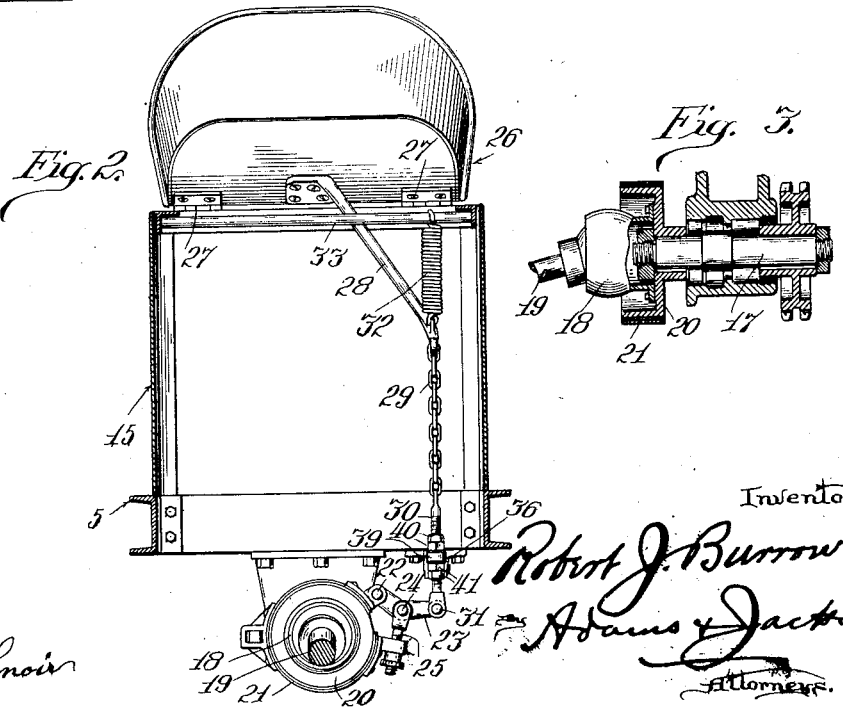

Patented Dec. 9, 1924.

1,518,770

UNITED STATES PATENT OFFICE.

ROBERT J. BURROWS, OF BUCHANAN, MICHIGAN, ASSIGNOR TO CLARK TRUCTRACTOR COMPANY, OF BUCHANAN, MICHIGAN, A CORPORATION OF MICHIGAN.

VEHICLE BRAKE-OPERATING MECHANISM.

Application filed May 17, 1923. Serial No. 639,492.

*To all whom it may concern:*

Be it known that I, ROBERT J. BURROWS, a citizen of the United States, and a resident of Buchanan, in the county of Berrien and State of Michigan, have invented certain new and useful Improvements in Vehicle Brake-Operating Mechanism, of which the following is a specification, reference being had to the accompanying drawings.

This invention relates to improvements in means for controlling the application of a brake carried by a vehicle, and more particularly the application of a brake band to a drum that is secured upon a member of the propeller shaft of a small tractor such as are commonly employed in and about shops, railway stations and other places for pulling or pushing from place to place trucks used for the transportation of articles of various kinds. The object of the invention is to provide a construction that will automatically set or apply the brake immediately upon the driver or operator leaving his seat and which will in like manner release the brake as soon as such seat is occupied, and, during the time that the seat is occupied, may be operated at will through a foot or hand lever in the usual manner. Not only is such an automatic setting of the brake when the driver or operator leaves his seat obviously of great advantage in that it tends to avoid accidental movement of the vehicle as might often be the case if the driver or operator forgot to set the brake before leaving his seat, but it has the added advantage that, in the case of a motor vehicle, he cannot crank his engine with his transmission gears in mesh because the brake will hold too tightly to allow him to turn over the engine. I accomplish the stated object by the construction and arrangement of parts as shown in the drawing and hereinafter described, but, except as limiting words are used in some of the appended claims, it is to be understood that the invention is not limited to an embodiment such as here shown, but that it may be changed in many particulars to adapt it for use in connection with various kinds and makes of vehicles.

In the drawings,—

Fig. 1 is a view partly in side elevation and partly in vertical section of a shop tractor provided with my improvements;

Fig. 2 is a vertical section taken at line 2—2 of Fig. 1, the mechanism through which the tractor is propelled being omitted; and Fig. 3 is a sectional detail showing the forward member of the propeller shaft and the brake drum that is secured thereon.

Referring to the drawings,—5 indicates the frame of the chassis of a shop tractor of a type with which I have chosen to associate my brake mechanism. Inasmuch as my improvements are applicable to many different types of vehicles, I have not deemed it necessary to illustrate in detail mechanism for driving the vehicle shown other than sufficiently to make clear the operation of my present invention. As here shown, the frame 5 is supported in the usual manner by a rear axle having the usual differential gearing and arranged to be driven by means of a propeller shaft. Upon the rear axle are the usual wheels, one of which is indicated by 11, and at the forward end the frame is supported by a single wheel 12 journaled in a yoke 13 connected with a steering rod 14 as usual. Upon the rear portion of the frame 5 is a housing 15 which encloses the motor and other operating parts mounted on the frame. 16 indicates a drive chain that runs over a sprocket on the end of a shaft that is driven through the motor in the housing 15, and also runs over another sprocket fast on the forward end of a member 17 of the propeller shaft that is mounted in place, as shown in Fig. 3, below the frame of the vehicle. At its rear end this member 17 of the propeller shaft is connected by an ordinary universal coupling 18 with another member 19 of the propeller shaft. The motor vehicle thus far briefly referred to will be found illustrated and described in considerable detail in my pending application, Serial No. 637,150, filed May 7, 1923.

The propeller shaft member 17 has keyed or otherwise securely affixed to it a brake drum 20 around which extends an ordinary brake band 21. The ends of such brake band are separated, as usual, and to one end there is pivotally connected at 22 a lever 23, which lever intermediately of its ends has pivotally connected to it at 24 a rod 25 which is connected in any usual manner with the other end of the brake band. It is obvious that with this construction of braking means an upward pull on the outer end of the lever 23 will set or apply the brake. A spring, not shown, may be provided, as is common in brakes of this description, to normally hold the brake band more positively out of engagement with the drum.

For causing such a turning of the lever 23 as will draw the brake band into frictional engagement with the drum, I provide two separate means, one adapted to act automatically when the driver leaves his seat, and the other adapted to be operated by the driver while in his seat. The driver's seat is indicated by 26 and, as shown, it is pivotally connected at its forward edge with a fixed support which, in the construction here shown, is the forward part of the housing 15. The means shown for so connecting the seat in place are hinges 27. Secured to the under side of the seat is an arm 28 which, as here shown, extends rearwardly and also laterally—the lateral inclination being given to bring its lower end approximately directly over the lever 23. To the lower end of this arm 28 is secured the upper end of a flexible connection 29, here shown as a short piece of chain, and to the lower end of the chain is secured a rod 30 which at its lower end is pivotally connected at 31 with the outer end of the lever 23. 32 indicates a strong coiled spring which, as best shown in Fig. 1, is secured at its lower end to the lower end portion of the arm 28 and at its upper end is secured to a fixed member, which member, as here shown, is a rod 33 that extends transversely of the housing 15 and is secured at its ends in the frame of such housing immediately below the seat 26. The spring is preferably inclined slightly upwardly and rearwardly, so that when the weight of the driver or operator is removed from the seat it will act effectively to turn the seat up on its hinges as shown in Fig. 1. The effect of such turning of the seat will of course be to give a quick upward pull on the chain 29 and rod 30, and thus cause the brake band to operatively engage its drum.

Turning now to the other means for actuating the brake, 34 indicates a foot lever that is pivoted at 35 to a bracket 36 that is bolted to and depends from one of the side bar members of the frame 5, said foot lever at its forward end being turned up and projecting through an opening 37 in the platform of the machine and at such upturned end provided with a foot piece 38. The rear end of the foot lever 34 is provided with an eye 39 through which the rod 30 passes. This rod 30, as shown, is screw-threaded and has screwed upon it nuts 40 and 41 which lie, respectively, above and below the eye 39 of the foot lever and form abutments against which such eye can bear. It will be obvious that when the seat 26 is occupied the chain 29 will slacken and there will be no impediment to the free operation of the foot lever whenever it is desired to set the brake in the usual manner. Also, it will be obvious that when the weight of the occupant of the seat is removed, the slack of the chain will be immediately taken up and a sufficient pull given upon the lever 23 to set the brake, but as the upward movement of the rod 30 is such a short one, the foot lever 34 will be practically undisturbed. The nuts 40 and 41 can, of course, be adjusted on the screw-threaded rod 30 as desired, and when set in the required positions may be locked there by other nuts, as indicated in the drawing.

What I claim as my invention and desire to secure by Letters Patent, is—

1. The combination with a motor-driven vehicle comprising a propeller shaft, of a brake-drum on said shaft, a brake-band around said drum, a vertically-movable seat on the vehicle, an arm depending from said seat, means connecting said arm with said brake-band, and a spring connected with said arm and adapted when the seat is unoccupied to cause a raising of the seat and a tightening of the brake band on said drum.

2. The combination with a motor-driven vehicle comprising a propeller shaft, of a brake-drum on said shaft, a brake-band around said drum, a vertically-movable seat on the vehicle, an arm depending from said seat, means connecting said arm with said brake-band, said connecting means including a flexible member that is in slackened condition when the seat is lowered by the weight of an occupant, a pivoted lever having engagement with said connecting means and adapted when said seat is occupied to be moved to cause an operative engagement of the brake-band with the drum, and a spring connected with said depending arm adapted when the seat is unoccupied to cause a raising of the seat and a tightening of the brake-band on the drum.

3. The combination with a motor-driven vehicle comprising a propeller shaft, of a brake-drum on said shaft, a brake-band around said drum, a vertically-movable seat on the vehicle, means including a flexible member for connecting said brake-band with said seat, and a spring tending to normally raise the seat to cause the brake-band to operatively engage said drum.

4. The combination with a motor-driven vehicle comprising a propeller shaft, of a brake-drum on said shaft, a brake-band around said drum, a vertically-movable seat on the vehicle, means including a flexible member for connecting said brake-band with said seat, a spring tending to normally raise the seat to cause the brake-band to operatively engage the drum, and other means for causing the operative engagement of the brake-band with the drum when said seat is held in lowered position by the weight of an occupant.

5. The combination with a motor-driven vehicle comprising a propeller shaft, of a brake-drum on said shaft, a brake-band around said drum, a vertically-movable seat on the vehicle, means including a flexible member for connecting said brake-band with said seat, a spring tending to normally raise the seat to cause the brake-band to operatively engage the drum, and a pivoted lever that engages with the connecting means between the seat and the brake-band and adapted, when the seat is depressed by the weight of an occupant, to be moved to move said brake-band into operative engagement with the drum.

ROBERT J. BURROWS.